(12) United States Patent
Beck et al.

(10) Patent No.: US 9,423,006 B2
(45) Date of Patent: Aug. 23, 2016

(54) MULTI-STAGE PLANETARY VEHICLE TRANSMISSION

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 105 days.

(21) Appl. No.: 14/379,811

(22) PCT Filed: Jan. 10, 2013

(86) PCT No.: PCT/EP2013/050361
§ 371 (c)(1),
(2) Date: Aug. 20, 2014

(87) PCT Pub. No.: WO2013/127549
PCT Pub. Date: Sep. 6, 2013

(65) Prior Publication Data
US 2015/0018160 A1    Jan. 15, 2015

(30) Foreign Application Priority Data
Feb. 29, 2012  (DE) .......................... 10 2012 203 104

(51) Int. Cl.
*F16H 3/62*     (2006.01)
*F16H 37/06*    (2006.01)
*F16H 3/66*     (2006.01)

(52) U.S. Cl.
CPC .. *F16H 3/62* (2013.01); *F16H 3/66* (2013.01); *F16H 2200/0065* (2013.01); *F16H 2200/2012* (2013.01); *F16H 2200/2046* (2013.01)

(58) Field of Classification Search
CPC ................. F16H 2200/2012; F16H 2200/2046
See application file for complete search history.

(56) References Cited

U.S. PATENT DOCUMENTS 7,771,305 B1   8/2010 Hart et al.
7,887,453 B2   2/2011 Phillips et al.
(Continued)

FOREIGN PATENT DOCUMENTS

DE   10 2007 055 808 A1   6/2009
DE   10 2009 019 046 A1   11/2010
(Continued)

OTHER PUBLICATIONS

German Search Report Corresponding to 10 2012 203 068.9 mailed Nov. 13, 2012 6 pages.

(Continued)

*Primary Examiner* — Tisha Lewis
(74) *Attorney, Agent, or Firm* — Davis & Bujold PLLC; Michael J. Bujold

(57) ABSTRACT

A multi-gear transmission having a housing, planetary gearsets, shafts and shifting elements. Input shaft (1) is connected or can couple the sun gear of gearset (RS3), and can couple the sun gear of gearset (RS1) and the carrier of gearset (RS1) and can couple the sun gear of gearset (RS2). Output shaft (2) is connected directly to the ring gear of gearset (RS4) and is connected or couple indirectly the carrier of gearset (RS3). The sun gear and the carrier of gearset (RS1) and the sun gear of gearset (RS4) can in each case couple the housing. The ring gear of gearset (RS1) is connected to the carrier of gearset (RS4) and is or can couple the ring gear of gearset (RS2), and the carrier of gearset (RS2) and the ring gear of the third planetary gearset (RS3) are or can be connected to one another.

14 Claims, 3 Drawing Sheets

(56) References Cited

U.S. PATENT DOCUMENTS

| | | | |
|---|---|---|---|
| 8,663,055 B2 | 3/2014 | Brehmer et al. | |
| 8,992,373 B2 * | 3/2015 | Beck | F16H 3/666 475/271 |
| 9,182,014 B2 * | 11/2015 | Beck | F16H 3/66 |
| 9,234,569 B2 * | 1/2016 | Beck | F16H 3/66 |
| 2005/0054474 A1 * | 3/2005 | Tiesler | F16H 3/66 475/275 |
| 2009/0118062 A1 | 5/2009 | Phillips et al. | |
| 2009/0209389 A1 | 8/2009 | Phillips et al. | |

FOREIGN PATENT DOCUMENTS

| | | |
|---|---|---|
| DE | 10 2009 047 277 A1 | 6/2011 |
| JP | 2009-197927 A | 9/2009 |

OTHER PUBLICATIONS

German Search Report Corresponding to 10 2012 203 069.7 mailed Nov. 13, 2012 6 pages.

German Search Report Corresponding to 10 2012 203 104.9 mailed Nov. 13, 2012 6 pages.

International Search Report Corresponding to PCT/EP2013/050356 mailed Mar. 18, 2013 5 pages.

International Search Report Corresponding to PCT/EP2013/050357 mailed Mar. 18, 2013 5 pages.

International Search Report Corresponding to PCT/EP2013/050361 mailed Mar. 18, 2013 5 pages.

Written Opinion Corresponding to PCT/EP2013/050361 mailed Mar. 18, 2013 13 pages.

\* cited by examiner

| GEAR | ENGAGED SHIFT ELEMENTS | | | | | | TRANS. RATIO i | GEAR STEP φ |
|---|---|---|---|---|---|---|---|---|
| | BRAKE | | | CLUTCH | | | | |
| | E | D | F | B | C | A | | |
| G1 | × | | | | × | × | 5.534 | 1.618 |
| G2 | × | × | | | | × | 3.420 | 1.492 |
| G3 | × | | × | | | × | 2.292 | 1.351 |
| G4 | | × | × | | | × | 1.697 | 1.202 |
| G5 | | | × | | × | × | 1.412 | 1.212 |
| G6 | | | × | × | | × | 1.165 | 1.165 |
| G7 | | | × | × | × | | 1.000 | 1.287 |
| G8 | | | × | × | × | | 0.777 | 1.263 |
| G9 | | × | × | × | | | 0.615 | TOTAL |
| R | × | | × | | × | | -2.952 | 8.999 |
| Z | | × | | × | | × | 0.900 | |

MULTI-STAGE PLANETARY VEHICLE TRANSMISSION

This application is a National Stage completion of PCT/EP2013/050361 filed Jan. 10, 2013, which claims priority from German patent application serial no. 10 2012 203 104.9 filed Feb. 29, 2012.

FIELD OF THE INVENTION

The present invention concerns a multi-gear planetary transmission for a vehicle.

BACKGROUND OF THE INVENTION

For example from the document U.S. Pat. No. 7,887,453 B2 a multi-gear transmission of planetary design for a vehicle is known. The multi-gear transmission comprises four planetary gearsets and six shifting elements, such that nine forward gears and one reverse gear are obtained. From the shifting scheme of this known multi-gear transmission it is apparent that to obtain each gear, in each case only two of the shifting elements are closed. Because of the disk shifting elements that remain open, there are therefore undesirably high drag losses.

Furthermore, it is known that actuation of the shifting elements according to need has efficiency advantages compared with conventional hydraulic actuation. However, to enable actuation according to need, good accessibility of the shifting elements from outside the housing is advantageous.

Shifting elements that can be actuated according to need can in particular be understood to mean shifting elements which require little or no energy to maintain their shift position. Such shifting elements can be for example electro-hydraulic or electro-mechanical shifting elements.

SUMMARY OF THE INVENTION

Accordingly, the purpose of the present invention is to propose a multi-gear transmission of the type described to begin with, which is characterized by improved efficiency, little structural complexity, and with shifting elements which are optimally arranged for their actuation.

According to the invention, this objective is achieved by the characteristics specified in the description and from the drawings.

According to these, a multi-stage transmission of planetary design or multi-gear planetary transmission for a vehicle is proposed, which has a housing in which four planetary gearsets or four planetary gearwheel planes and preferably eight rotating shafts as well as six shifting elements are accommodated. By actuating the shifting elements several gears can be obtained.

In this way, the first shaft, which is the drive input or drive input shaft, can be or is connected respectively to the sun gears of the first, second and third planetary gearsets and to the planetary gearwheel carrier or planetary carrier of the first planetary gearset and to the housing, the second shaft, which is the drive output or drive output shaft, can be or is connected to the ring gear of the fourth planetary gearset and to the planetary carrier of the third planetary gearset, the ring gear of the first planetary gearset can be or is connected to the ring gear of the second planetary gearset and to the planetary carrier of the fourth planetary gearset, the planetary carrier of the second planetary gearset can be or is connected to the ring gear of the third planetary gearset, and the sun gear of the fourth planetary gearset can be connected to the housing, a multi-gear transmission according to the invention is obtained which preferably enables efficiency-improving actuation of the shifting elements according to need by virtue of good accessibility of the shifting elements from the outside. Furthermore, thanks to the connections chosen according to the invention between the elements of the transmission, an optimized series of transmission ratios is obtained in the proposed multi-gear transmission, with low absolute and relative rotational speeds and low planetary gearset and shifting element torques. In addition, the arrangement of gearsets results in improved gearing efficiencies and low component loading as well as little structural complexity, so that the production costs and the weight of the multi-gear transmission are reduced in an advantageous manner.

The good accessibility of the shifting elements is achieved, inter alia, on the one hand by using brakes and on the other hand also clutches as shifting elements, which are positioned on external shafts, preferably on the drive input and drive output shafts in the multi-gear transmission according to the invention.

As viewed in the axial direction, the planetary gearsets are arranged in the sequence of first planetary gearset, second planetary gearset, third planetary gearset and fourth planetary gearset, and preferably only minus planetary gearsets are provided. It is possible, however, at points where the connections permit, to change one or more of the minus planetary gearsets to plus planetary gearsets if at the same time the carrier and ring gear connections are interchanged and the value of the fixed transmission ratio is increased by one. As is known, a minus planetary gearset has planetary gearwheels mounted to rotate on its planetary carrier, which mesh with the sun gear and the ring gear of the planetary gearset, so that when the planetary carrier is held fixed and the sun gear is rotating, the ring gear rotates in the direction opposite to the rotation direction of the sun gear. As is also known, a plus planetary gearset has inner and outer planetary gearwheels mounted to rotate on its planetary carrier, which mesh with one another, wherein the sun gear of the planetary gearset meshes with the inner planetary gearwheels and the ring gear with the outer planetary gearwheels, so that when the planetary carrier is fixed and the sun gear is rotating, the ring gear rotates in the same direction as the sun gear.

In advantageous embodiment variants of the present invention it can be provided that, preferably, various arrangement positions are possible for the first shifting element, which represent gearset alternatives of functionally equivalent design. In this case, essentially, instead of a detachable connection between the drive input shaft and the sun gear of the third planetary gearset, a fixed connection is provided and by way of the first shifting element the detachable connection between transmission elements is located at another predetermined position in the multi-gear transmission. For example, the detachable connection can be provided between the planetary carrier of the third planetary gearset and the ring gear of the fourth planetary gearset or the drive output shaft. It is also conceivable for the detachable connection to be arranged between the planetary carrier of the second planetary gearset and the ring gar of the third planetary gearset. The detachable connection can also be arranged between the ring gear of the first planetary gearset and the planetary carrier of the fourth planetary gearset on the one hand, and the ring gear of the second planetary gearset on the other hand. Finally, it is also conceivable for the detachable connection to be arranged between the sun gear of the second planetary gearset on the one hand and the planetary carrier of the first planetary gearset or the drive input shaft on the other hand.

The term shifting element should be understood to mean a shiftable connection between two elements of the transmission, such that the torque to be transferred between the two elements is transferred by force or friction locking or by shape interlocking. If both elements of the shiftable connection are designed to rotate the shifting element is termed a clutch, whereas if only one of the two elements of the shiftable connection rotates the shifting element is called a brake. Moreover, the geometrical arrangement or sequence of the individual shifting elements can be chosen as desired provided that it permits appropriate connections between the elements. In this way the position of individual elements can be displaced as desired. Example embodiments of frictional shifting elements are disk clutches or brakes, band brakes, conical clutches or brakes, electromagnetic clutches, magnetic powder clutches and electro-rheological clutches. Example embodiments of interlocking shifting elements are claw clutches or brakes and tooth clutches.

Preferably, by virtue of their characteristics above all the first shifting element and the fifth shifting element can be in the form of interlocking shifting elements, for example claw shifting elements, whereby substantial fuel consumption advantages are achieved.

By virtue of the coaxial arrangement of the drive input and drive output, the multi-gear transmission according to the invention can be used to produce a standard drive configuration in a vehicle. It is also possible, however, to produce a front transverse configuration with the planetary transmission in a vehicle, if the geometrical arrangement and hence the sequence of the elements of the planetary transmission, such as the arrangement of the individual planetary gearsets and shifting elements, is changed, provided that the appropriate connections between the transmission elements are permitted, in such manner that for example the drive input and the drive output are arranged offset relative to one another.

As the starting element in the multi-gear transmission according to the invention, a hydrodynamic torque converter or a hydrodynamic clutch can be used. It is also conceivable to use an additional starting clutch or even an integrated starting clutch or starting brake. Furthermore, an electric machine or some other force/power source can be arranged on at least one of the shafts. Moreover, on at least one of the shafts a freewheel to the housing or to another shaft can be arranged.

BRIEF DESCRIPTION OF THE DRAWINGS

Below, the present invention is explained in more detail with reference to the drawings, which show.

DETAILED DESCRIPTION OF THE PREFERRED EMBODIMENTS

Figure 1:
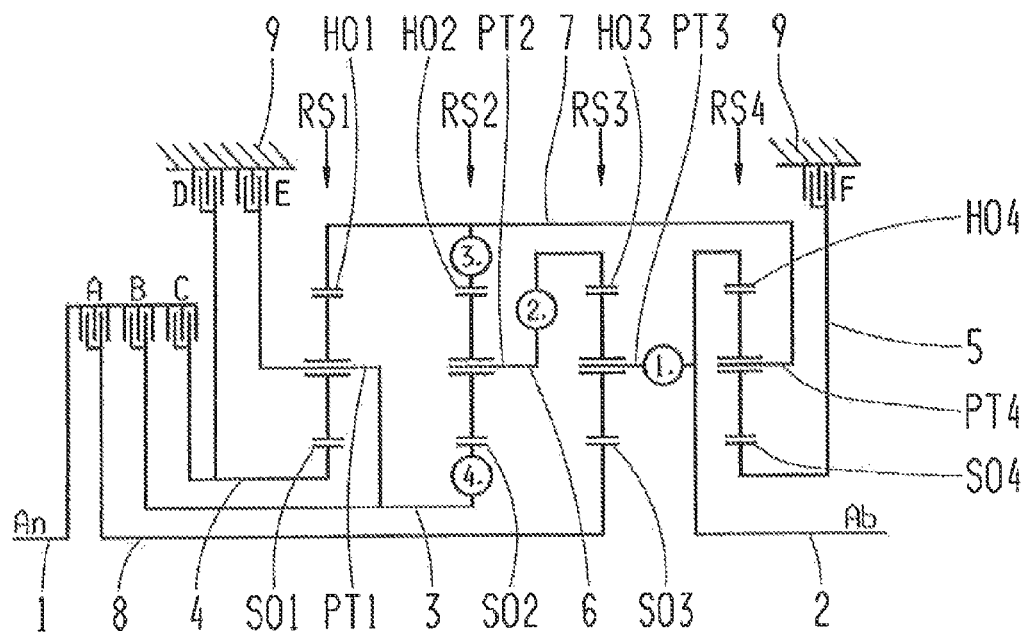
FIG. 1: A schematic view of a first embodiment variant of a multi-gear transmission according to the invention, indicating four alternative arrangement positions for a first shifting element.

The figures show as examples various embodiment variants of a multi-gear planetary transmission according to the invention, used for example as an automatic transmission or automated transmission in a vehicle.

Regardless of the particular embodiment variant concerned, the multi-gear transmission comprises a housing 9 with four planetary gearsets RS1, S2, RS3, RS4 and with six shifting elements A, B, C, D, E, F, as well as eight rotating shafts 1, 2, 3, 4 5, 6, 7, 8, 8A, 8B, 8C, 8D, the term shaft being understood to mean one or more components, of any design form, which connect or couple at least two elements of the multi-gear transmission. In the multi-gear transmission proposed the housing couplings required are produced by shifting elements in the form of brakes, so that no fixed housing couplings are provided.

As the planetary gearsets, minus planetary gearsets are used for all the planetary gearsets RS1, RS2, RS3 and RS4. Furthermore, the first, second and third shifting elements A B, C are in each case clutches and the fourth, fifth and sixth shifting elements are all brakes. In this case, for example, disk brakes or clutches are shown, preferably with the first shifting element A in the form of a claw clutch and the fifth shifting element E in the form of a claw brake in order to save fuel.

According to the invention, in the multi-gear transmission it is provided that the first shaft 1 is the drive input An and is directly connected or can be indirectly connected to the sun gear SO3 of the third planetary gearset RS3. This means that the first shaft 1 is either connected to the sun gear SO3 without other, intermediate elements, i.e. directly, or that the first shaft 1 is connected detachably to the sun gear SO3 indirectly, i.e. for example by way of the first shifting element A and another shaft 8. Furthermore, the first shaft 1 can be connected to the sun gear SO1 of the first planetary gearset RS1 and to the planetary carrier PT1 of the first planetary gearset RS1 as well as to the sun gear SO2 of the second planetary gearset RS2, in each case indirectly. The second shaft 2 is the drive output Ab and is connected directly to the ring gear HO4 of the fourth planetary gearset RS4. This means that the second shaft 2 is connected to the ring gear HO4 directly, i.e. without other, intermediate elements. In addition, the second shaft 2 is directly connected or can be indirectly connected to the planetary carrier PT3 of the third planetary gearset RS3. This means that the second shaft 2 is either connected directly to the planetary carrier PT3, i.e. without other, intermediate elements, or that the second shaft 2 is connected indirectly and detachably to the planetary carrier PT3, for example by way of the first shifting element A and a further shaft 8A. Moreover, the sun gear SO1 and the planetary carrier PT1 of the first planetary gearset RS1 and also the sun gear SO4 of the fourth planetary gearset RS4 can in each case be connected to the housing 9. In addition, the ring gear HO1 of the first planetary gearset RS1 is connected to the planetary carrier PT4 of the fourth planetary gearset RS4 and is or can be connected to the ring gear HO2 of the second planetary gearset RS2. Finally, the planetary carrier PT2 of the second planetary gearset RS2 and the ring gear HO3 of the third planetary gearset HO3 are or can be connected to one another.

With the connection possibilities described, four functionally equivalent arrangement positions of the first shifting element A are obtained. The alternative arrangement positions are illustrated in five different embodiment variants of the multi-gear transmission, as shown in FIGS. 1 to 5.

FIG. 1 shows a first embodiment variant, in which the four other arrangement positions of the first shifting element A are denoted or indicated as 1. (corresponding to the second embodiment variant according to FIG. 2), 2. (corresponding to the third embodiment variant according to FIG. 3), 3.

(corresponding to the fourth embodiment variant according to FIG. 4) and 4. (corresponding to the fifth embodiment variant according to FIG. 5).

In the gearset shown in FIG. 1 according to the first embodiment variant of the multi-gear transmission, it is provided that the first shaft 1 can be connected by way of the first shifting element A in the form of a clutch and by way of the eighth shaft 8 to the sun gear SO3 of the third planetary gearset RS3, which means that the first shaft 1 is detachably connected to the sun gear SO3 of the third planetary gearset RS3. Furthermore, the first shaft 1 can be or is detachably connected by way of the second shifting element B in the form of a clutch and by way of the third shaft 3 to the planetary carrier PT1 of the first planetary gearset RS1 and to the sun gear of the second planetary gearset RS2, whereas the planetary carrier PT1 of the first planetary gearset RS1 is detachably connected to the housing 9 by way of the third shaft 3 and by way of the fifth shifting element E in the form of a brake. In addition the first shaft 1 is detachably connected by way of the third shifting element C in the form of a clutch and by way of the fourth shaft 4 to the sun gear SO1 of the first planetary gearset RS1, whereas the sun gear SO1 of the first planetary gearset RS1 is detachably connected by way of the fourth shaft 4 and the fourth shifting element D in the form of a brake to the housing 9. The second shaft 2 is connected to the ring gear HO4 of the fourth planetary gearset RS4 and to the planetary carrier PT3 of the third planetary gearset RS3. The ring gear HO1 of the first planetary gearset RS1 is connected by way of the seventh shaft 7 to the ring gear HO2 of the second planetary gearset RS2 and to the planetary carrier PT4 of the fourth planetary gearset RS4. The planetary carrier PT2 of the second planetary gearset RS2 is connected by the sixth shaft 6 to the ring gear HO3 of the third planetary gearset RS3. The sun gear SO4 of the fourth planetary gearset RS4 is detachably connected by way of the fifth shaft 5 and the sixth shifting element F in the form of a brake, to the housing 9.

Figure 2:
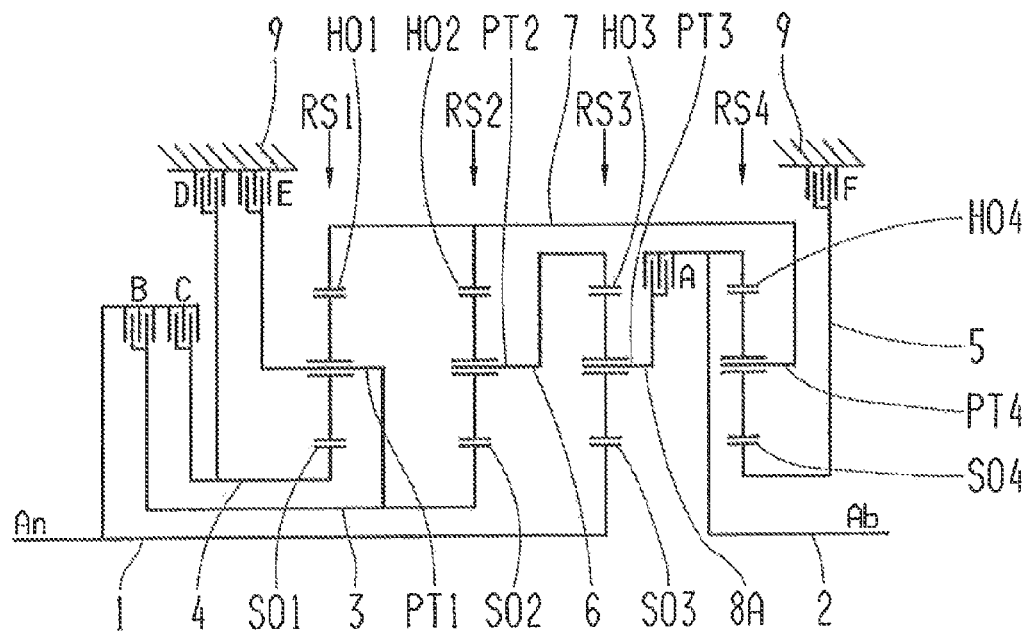
FIG. 2: A schematic view of a second embodiment variant of the multi-gear transmission.

As shown in FIG. 2, in the second embodiment variant of the invention it is provided that the first shaft 1 is connected to the sun gear SO3 of the third planetary gearset RS3. In addition, by means of the second shifting element B in the form of a clutch and by way of the third shaft 3 the first shaft 1 is connected to the planetary carrier PT1 of the first planetary gearset RS1 and to the sun gear SO2 of the second planetary gearset RS2, whereas by way of the third shaft 3 and the fifth shifting element E in the form of a brake the planetary carrier PT1 of the first planetary gearset RS1 can be detachably connected to the housing 9. Furthermore, the first shaft 1 is detachably connected by the third shifting element C in the form of a clutch and by way of the fourth shaft 4 to the sun gear SO1 of the first planetary gearset RS1, whereas the sun gear SO1 of the first planetary gearset RS1 is detachably connected by the fourth shaft 4 and by way of the fourth shifting element D in the form of a brake to the housing 9. Moreover, the second shaft 2 is connected to the ring gear HO4 of the fourth planetary gearset RS4. In addition, the second shaft 2 is detachably connected by the first shifting element A in the form of a clutch and by way of the shaft 8A to the planetary carrier PT3 of the third planetary gearset RS3. Moreover, the ring gear HO1 of the first planetary gearset RS1 is connected by the seventh shaft 7 to the ring gear HO2 of the second planetary gearset RS2 and to the planetary carrier PT4 of the fourth planetary gearset RS4. The planetary carrier PT2 of the second planetary gearset RS2 is connected by the sixth shaft 6 to the ring gear HO3 of the third planetary gearset RS3. Furthermore, the sun gear SO4 of the fourth planetary gearset RS4 is detachably connected to the housing 9 by way of the fifth shaft 5 and the sixth shifting element F in the form of a brake.

Figure 3:
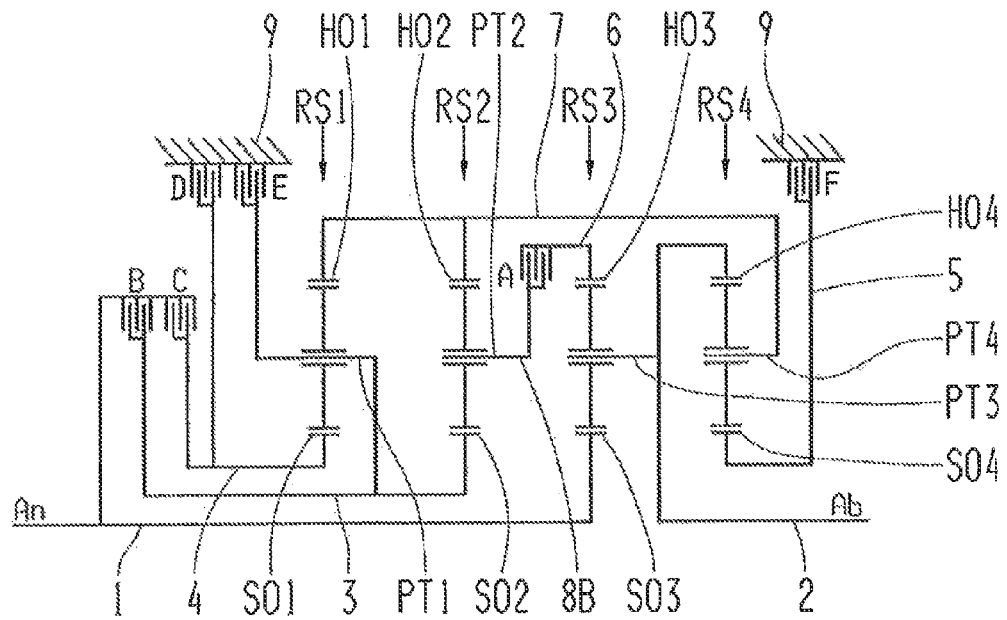
FIG. 3: A schematic view of a third embodiment variant of the multi-gear transmission.

FIG. 3 shows a third embodiment variant of the invention, in which the first shaft 1 is connected to the sun gear SO3 of the third planetary gearset RS3. In addition, the first shaft 1 is detachably connected by way of the second shifting element B in the form of a clutch and by way of the third shaft 3 to the planetary carrier PT1 of the first planetary gearset RS1 and to the sun gear SO2 of the second planetary gearset RS2, whereas the planetary carrier PT1 of the first planetary gearset RS1 is detachably connected by the third shaft 3 and by way of the fifth shifting element E in the form of a brake to the housing 9. Moreover, the first shaft 1 is detachably connected by way of the third shifting element C in the form of a clutch and by way of the fourth shaft 4 to the sun gear SO1 of the first planetary gearset RS1, whereas the sun gear of the first planetary gearset RS1 is detachably connected by way of the fourth shaft 4 and by the fourth shifting element D in the form of a brake to the housing 9. The second shaft 2 is connected to the ring gear HO4 of the fourth planetary gearset RS4 and to the planetary carrier PT3 of the third planetary gearset RS3. The ring gear HO1 of the first planetary gearset RS1 is connected by way of the seventh shaft 7 to the ring gear HO2 of the second planetary gearset RS2 and to the planetary carrier PT4 of the fourth planetary gearset RS4. In addition, the ring gear HO3 of the third planetary gearset RS3 is detachably connected via the sixth shaft 6 and by way of the first shifting element A in the form of a clutch, as well as by way of the eighth shaft 8B, to the planetary carrier PT2 of the second planetary gearset RS2. The sun gear SO4 of the fourth planetary gearset RS4 is detachably connected by the fifth shaft 5 and by way of the sixth shifting element F in the form of a brake to the housing 9.

Figure 4:
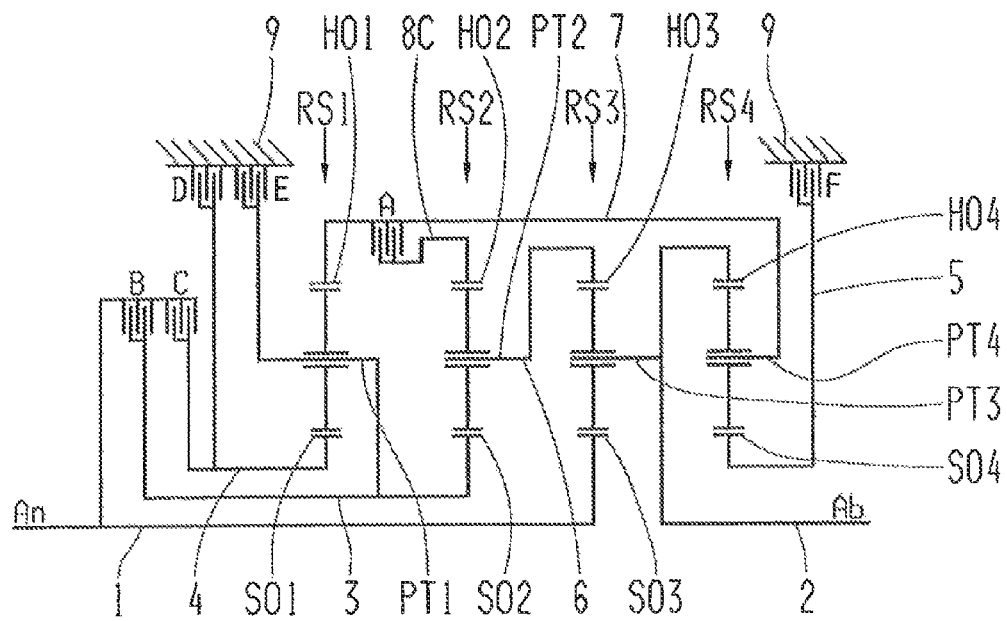
FIG. 4: A schematic view of a fourth embodiment variant of the multi-gear transmission.

According to FIG. 4, in the fourth embodiment variant it is provided that the first shaft 1 is connected to the sun gear SO3 of the third planetary gearset RS3. In addition, the first shaft 1 is detachably connected by the second shifting element B in the form of a clutch and by the third shaft 3 to the planetary carrier PT1 of the first planetary gearset RS1 and to the sun gear SO2 of the second planetary gearset RS2, whereas the planetary carrier PT1 of the first planetary gearset RS1 is detachably connected by the third shaft 3 and by way of the fifth shifting element E in the form of a brake to the housing 9. The first shaft 1 is detachably connected by the third shifting element C in the form of a clutch and by the fourth shaft 4 to the sun gear SO1 of the first planetary gearset RS1, whereas the sun gear SO1 of the first planetary gearset RS1 is detachably connected by the fourth shaft 4 and by the fourth shifting element D in the form of a brake to the housing 9. Furthermore, the second shaft 2 is connected to the ring gear HO4 of the fourth planetary gearset RS4 and to the planetary carrier PT3 of the third planetary gearset RS3. The ring gear HO1 of the first planetary gearset RS1 is connected by way of the seventh shaft 7 to the planetary carrier PT4 of the fourth planetary gearset RS4. Moreover, the ring gear HO1 of the first planetary gearset RS1 is detachably connected via the seventh shaft 7 and the first shifting element A in the form of a clutch, and in addition by way of the eighth shaft 8C, to the ring gear HO2 of the second planetary gearset RS2. The planetary carrier PT2 of the second planetary gearset RS2 is connected by the sixth shaft 6 to the ring gear HO3 of the third planetary gearset RS3. Finally, the sun gear SO4 of the fourth planetary gearset RS4 is detachably connected by the fifth shaft 5 and by way of the sixth shifting element F in the form of a brake to the housing 9.

Figures 5, 6:
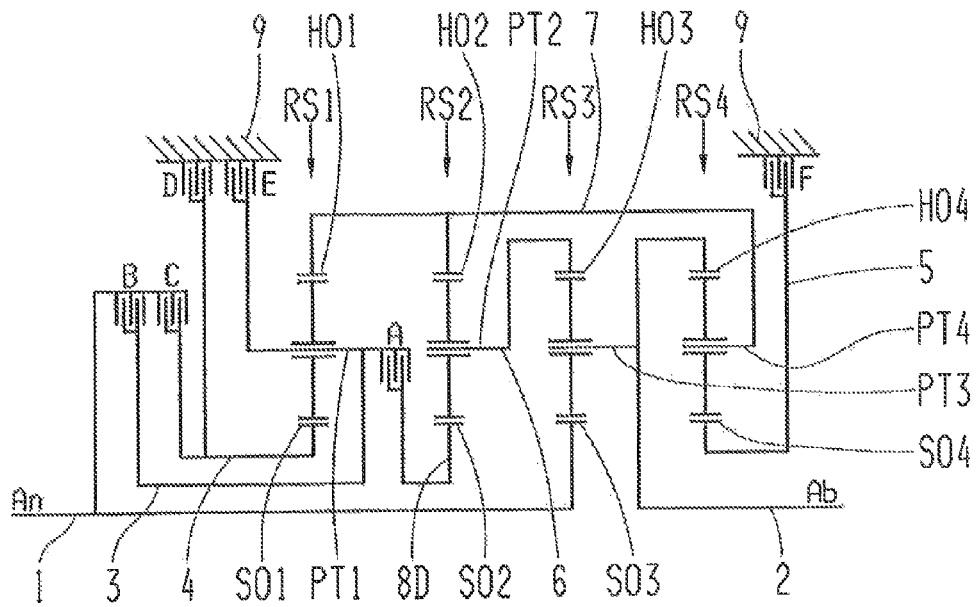
FIG. 5: A schematic view of a fifth embodiment variant of the multi-gear transmission.
FIG. 6: A shifting scheme for the various embodiment variants of the multi-gear transmission.

FIG. 5 shows the fifth embodiment variant, in which the first shaft 1 is connected to the sun gear SO3 of the third planetary gearset RS3. Furthermore, the first shaft 1 is detachably connected by the second shifting element B in the form of a clutch and by the third shaft 3 to the planetary carrier PT1 of the first planetary gearset RS1 and by the first shifting element A in the form of a clutch and the eighth shaft 8D to the sun gear SO2 of the second planetary gearset RS2, whereas the planetary carrier PT1 of the first planetary gearset RS1 is detachably connected by the third shaft 3 and the shifting element E in the form of a brake to the housing 9. Moreover, the first shaft 1 is detachably connected by the third shifting element C and the fourth shaft 4 to the sun gear SO1 of the first planetary gearset RS1, whereas the sun gear SO1 of the first planetary gearset RS1 is detachably connected by the fourth shaft 4 and by the fourth shifting element D in the form of a brake to the housing 9. The second shaft 2 is connected to the ring gear HO4 of the fourth planetary gearset RS4 and to the planetary carrier PT3 of the third planetary gearset RS3. The ring gear HO1 of the first planetary gearset RS1 is connected by the seventh shaft 7 to the ring gear HO2 of the second planetary gearset RS2 and to the planetary carrier PT4 of the fourth planetary gearset RS4. Furthermore, the planetary carrier PT2 of the second planetary gearset RS2 is detachably connected by the sixth shaft 6 to the ring gear HO3 of the third planetary gearset RS3. The sun gear SO4 of the fourth planetary gearset RS4 is detachably connected via the fifth shaft 5 and the sixth shifting element F in the form of a brake to the housing 9.

FIG. 6 shows a shifting scheme that applies to the functionally equivalent gearsets shown in FIGS. 1 to 5. The shifting scheme shows in the form of a table the shifting elements A, B, C, D, E, F to be closed or actuated in order to obtain the various gears, indicating also a transmission ratio i for each gear and the respective gear intervals φ between different gears. Besides the nine forward gears G1, G2, G3, G4, G5, G6, G7, G8, G9 and the one reverse gear R indicated, a further, additional shifting combination Z is given as another possible gear step. As preferred fixed transmission ratios, values of around $i_0=-3.800$ can be used for the first planetary gearset RS1, around $i_0=-1.500$ for the second planetary gearset RS2, around $i_0=-2.420$ for the third planetary gearset RS3 and around $i_0=-3.480$ for the fourth planetary gearset RS4. Furthermore, the shifting scheme shows that to engage a gear, in each case three of the shifting elements are closed. To carry out a gearshift, only two shifting elements have to be shifted at the same time.

To be specific, the shifting scheme in FIG. 6 shows that to obtain the first forward gear G1 the first shifting element A, the third shifting element C and the fifth shifting element E are closed. To obtain the second forward gear G2 the first shifting element A, the fourth shifting element D and the fifth shifting element E are closed. In the third forward gear G3 the first shifting element A, the fifth shifting element E and the sixth shifting element F are closed. To obtain the fourth forward gear G4 the first shifting element A, the fourth shifting element D and the sixth shifting element F are closed. In the fifth forward gear G5 the first shifting element A, the third shifting element C and the sixth shifting element F are closed. In the sixth forward gear G6 the first shifting element A, the second shifting element B and the sixth shifting element F are closed. To obtain the seventh forward gear G7 the first shifting element A, the second shifting element B and the third shifting element C are closed. To obtain the eighth forward gear G8 the second shifting element B, the third shifting element C and the sixth shifting element F are closed. For the ninth forward gear G9 the second shifting element B, the fourth shifting element D and the sixth shifting element F are closed. For the reverse gear R the third shifting element C, the fifth shifting element E and the sixth shifting element F are closed. In the additional gear Z the first shifting element A, the second shifting element B and the fourth shifting element D are closed.

INDEXES

1 First shaft, drive input shaft
2 Second shaft, drive output shaft
3 Third shaft
4 Fourth shaft
5 Fifth shaft
6 Sixth shaft
7 Seventh shaft
8, 8A, 8B, 8C, 8D Eighth shaft
9 Housing
A First shifting element
B Second shifting element
C Third shifting element
Fourth shifting element
E Fifth shifting element
F Sixth shifting element
RS1 First planetary gearset
RS2 Second planetary gearset
RS3 Third planetary gearset
RS4 Fourth planetary gearset
SO1 Sun gear of the first planetary gearset
PT1 Planetary carrier of the first planetary gearset
HO1 Ring gear of the first planetary gearset
SO2 Sun gear of the second planetary gearset
PT2 Planetary carrier of the second planetary gearset
HO2 Ring gear of the second planetary gearset
SO3 Sun gear of the third planetary gearset
PT3 Planetary carrier of the third planetary gearset
HO3 Ring gear of the third planetary gearset
SO4 Sun gear of the fourth planetary gearset
PT4 Planetary carrier of the fourth planetary gearset
HO4 Ring gear of the fourth planetary gearset
G1 First forward gear
G2 Second forward gear
G3 Third forward gear
G4 Fourth forward gear
G5 Fifth forward gear
G6 Sixth forward gear
G7 Seventh forward gear
G8 Eighth forward gear
G9 Ninth forward gear
R Reverse gear
Z Additional gear
1. First alternative arrangement position of the first shifting element
2. Second alternative arrangement position of the first shifting element
3. Third alternative arrangement position of the first shifting element
4. Fourth alternative arrangement position of the first shifting element
i Transmission ratio
$i_0$ Fixed transmission ratio of a planetary gearset
φ Gear interval

The invention claimed is:
1. A multi-gear transmission of a planetary design for a vehicle, the transmission comprising:
 first, second, third and fourth planetary gearsets (RS1, RS2, RS3, RS4) arranged in a housing (9), and each of the first, the second, the third and the fourth planetary gearsets comprising a sun gear, a ring gear and a planetary carrier;

first, second, third, fourth, fifth, sixth, seventh and eighth shafts (1, 2, 3, 4, 5, 6, 7, 8, 8A, 8B, 8C, 8D) arranged in the housing (9);

first, second, third, fourth, fifth and sixth shifting elements (A, B, C, D, E, F) arranged in the housing (9), and selective actuation of the first, the second, the third, the fourth, the fifth and the sixth shifting elements implement a plurality of gear steps;

the first shaft (1) being a drive input (An) and being either directly connected or indirectly connectable to the sun gear (SO3) of the third planetary gearset (RS3), the first shaft (1) being indirectly connectable to:
  the sun gear (SO1) of the first planetary gearset (RS1),
  the planetary carrier (PT1) of the first planetary gearset (RS1), and
  the sun gear (SO2) of the second planetary gearset (RS2);

the second shaft (2) being a drive output (Ab) and being directly connected to the ring gear (HO4) of the fourth planetary gearset (RS4), and the second shaft (2) being either directly connected or indirectly connectable to the planetary carrier (PT3) of the third planetary gearset (RS3);

the sun gear (SO1) and the planetary carrier (PT1) of the first planetary gearset (RS1) and the sun gear (SO4) of the fourth planetary gearset (RS4) are respectively connectable to the housing (9);

the ring gear (HO1) of the first planetary gearset (RS1) is connected to the planetary carrier (PT4) of the fourth planetary gearset (RS4) and is either connected or connectable to the ring gear (HO2) of the second planetary gearset (RS2);

the planetary carrier (PT2) of the second planetary gearset (RS2) and the ring gear (HO3) of the third planetary gearset (RS3) being either connected or connectable to one another;

a first forward gear is implemented by engagement of the first, the third and the fifth shifting elements and disengagement of the second, the fourth and the sixth shifting elements;

a second forward gear is implemented by engagement of the first, the fourth and the fifth shifting elements and disengagement of the second, the third and the sixth shifting elements;

a third forward gear is implemented by engagement of the first, the fifth and the sixth shifting elements and disengagement of the second, the third and the fourth shifting elements;

a fourth forward gear is implemented by engagement of the first, the fourth and the sixth shifting elements and disengagement of the second, the third and the fifth shifting elements;

a fifth forward gear is implemented by engagement of the first, the third and the sixth shifting elements and disengagement of the second, the fourth and the fifth shifting elements;

a sixth forward gear is implemented by engagement of the first, the second and the sixth shifting elements and disengagement of the third, the fourth and the fifth shifting elements;

a seventh forward gear is implemented by engagement of the first, the second and the third shifting elements and disengagement of the fourth, the fifth and the sixth shifting elements;

an eighth forward gear is implemented by engagement of the second, the third and the sixth shifting elements and disengagement of the first, the fourth and the fifth shifting elements;

a ninth forward gear is implemented by engagement of the second, the fourth and the sixth shifting elements and disengagement of the first, the third and the fifth shifting elements;

a first reverse gear is implemented by engagement of the third, the fifth and the sixth shifting elements and disengagement of the first, the second and the fourth shifting elements; and a second reverse gear is implemented by engagement of the first, the second and the fourth and disengagement of the third, the fifth and the sixth shifting elements.

2. The multi-gear transmission according to claim 1, wherein the first, the second and the third shifting elements (A, B, C) are each clutches and the fourth, the fifth and the sixth shifting elements (D, E, F) are each brakes;

the first shaft (1) is connectable, via the first shifting element (A) and the eighth shaft (8), to the sun gear (SO3) of the third planetary gearset (RS3), the first shaft (1) is connectable, via the second shifting element (B) and the third shaft (3), to both the planetary carrier (PT1) of the first planetary gearset (RS1) and the sun gear (SO2) of the second planetary gearset (RS2), the planetary carrier (PT1) of the first planetary gearset (RS1) is connectable, via the third shaft (3) and the fifth shifting element (E), to the housing (9), the first shaft (1) is connectable, via the third shifting element (C) and the fourth shaft (4), to the sun gear (SO1) of the first planetary gearset (RS1), and the sun gear (SO1) of the first planetary gearset (RS1) is connectable, via the fourth shaft (4) and the fourth shifting element (D), to the housing (9);

the second shaft (2) is connected to the ring gear (HO4) of the fourth planetary gearset (RS4) and to the planetary carrier (PT3) of the third planetary gearset (RS3);

the ring gear (HO1) of the first planetary gearset (RS1) is connected, via the seventh shaft (7), to the ring gear (HO2) of the second planetary gearset (RS2) and the planetary carrier (PT4) of the fourth planetary gearset (RS4);

the planetary carrier (PT2) of the second planetary gearset (RS2) is connected to the ring gear (HO3) of the third planetary gearset (RS3) by the sixth shaft (6); and the sun gear (SO4) of the fourth planetary gearset (RS4) is connectable, via the fifth shaft (5) and the sixth shifting element (F), to the housing (9).

3. The multi-gear transmission according to claim 1, wherein the first, the second and the third shifting elements (A, B, C) are each clutches and the fourth, the fifth and the sixth shifting elements (D, E, F) are each brakes;

the first shaft (1) is connected to the sun gear (SO3) of the third planetary gearset (RS3);

the first shaft (1) is connectable, via the second shifting element (B) and the third shaft (3), to the planetary carrier (PT1) of the first planetary gearset (RS1) and to the sun gear (SO2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and the fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to the ring gear (HO4) of the fourth planetary gearset (RS4) and the second shaft (2) is connectable, via the first shifting element (A) and the eighth shaft (8A), to the planetary carrier (PT3) of the third planetary gearset (RS3);

the ring gear (HO1) of the first planetary gearset (RS1) is connected, by the seventh shaft (7), to both the ring gear (HO2) of the second planetary gearset (RS2) and to the planetary carrier (PT4) of the fourth planetary gearset (RS4);

the planetary carrier (PT2) of the second planetary gearset (RS2) is connected by the sixth shaft (6) to the ring gear (HO3) of the third planetary gearset (RS3); and the sun gear (SO4) of the fourth planetary gearset (RS4) is connectable, via the fifth shaft (5) and the sixth shifting element (F), to the housing (9).

4. The multi-gear transmission according to claim 1, wherein the first, the second and the third shifting elements (A, B, C) are each clutches and the fourth, the fifth and the sixth shifting elements (D, E, F) are each brakes;

the first shaft (1) is connected to the sun gear (SO3) of the third planetary gearset (RS3);

the first shaft (1) is connectable, via the second shifting element (B) and the third shaft (3), to both the planetary carrier (PT1) of the first planetary gearset (RS1) and the sun gear (SO2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and the fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (HO4) of the fourth planetary gearset (RS4) and to the planetary carrier (PT3) of the third planetary gearset (RS3);

the ring gear (HO1) of the first planetary gearset (RS1) is connected, by the seventh shaft (7), to both the ring gear (HO2) of the second planetary gearset (RS2) and to the planetary carrier (PT4) of the fourth planetary gearset (RS4);

the ring gear (HO3) of the third planetary gearset (RS3) is connectable, via the sixth shaft (6) and the first shifting element (A) and the eighth shaft (8B), to the planetary carrier (PT2) of the second planetary gearset (RS2); and the sun gear (SO4) of the fourth planetary gearset (RS4) is connectable, via the fifth shaft (5) and the sixth shifting element (F), to the housing (9).

5. The multi-gear transmission according to claim 1, wherein the first, the second and the third shifting elements (A, B, C) are each clutches and the fourth, the fifth and the sixth shifting elements (D, E, F) are each brakes;

the first shaft (1) is connected to the sun gear (SO3) of the third planetary gearset (RS3);

the first shaft (1) is connectable, via the second shifting element (B) and the third shaft (3), to both the planetary carrier (PT1) of the first planetary gearset (RS1) and to the sun gear (SO2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and the fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (HO4) of the fourth planetary gearset (RS4) and the planetary carrier (PT3) of the third planetary gearset (RS3);

the ring gear (HO1) of the first planetary gearset (RS1) is connected, by the seventh shaft (7), to the planetary carrier (PT4) of the fourth planetary gearset (RS4);

the ring gear (HO1) of the first planetary gearset (RS1) is connectable, via the seventh shaft (7) and the first shifting element (A) and the eighth shaft (8C), to the ring gear (HO2) of the second planetary gearset (RS2);

the planetary carrier (PT2) of the second planetary gearset (RS2) is connected by the sixth shaft (6) to the ring gear (HO3) of the third planetary gearset (RS3); and the sun gear (SO4) of the fourth planetary gearset (RS4) is connectable, via the fifth shaft (5) and the sixth shifting element (F), to the housing (9).

6. The multi-gear transmission according to claim 1, wherein the first, the second and the third shifting elements (A, B, C) are each clutches and the fourth, the fifth and the sixth shifting elements (D, E, F) are each brakes;

the first shaft (1) is connected to the sun gear (SO3) of the third planetary gearset (RS3);

the first shaft (1) is connectable, via the second shifting element (B), to the third shaft (3) which is connected to the planetary carrier (PT1) of the first planetary gearset (RS1);

the third shaft (3) is connectable, via the first shifting element (A) and the eighth shaft (8D), to the sun gear (SO2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and the fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (HO4) of the fourth planetary gearset (RS4) and the planetary carrier (PT3) of the third planetary gearset (RS3);

the ring gear (HO1) of the first planetary gearset (RS1) is connected, by the seventh shaft (7), to both the ring gear (HO2) of the second planetary gearset (RS2) and the planetary carrier (PT4) of the fourth planetary gearset (RS4);

the planetary carrier (PT2) of the second planetary gearset (RS2) is connected, by the sixth shaft (6), to the ring gear (HO3) of the third planetary gearset (RS3); and the sun gear (SO4) of the fourth planetary gearset (RS4) is connectable, via the fifth shaft (5) and the sixth shifting element (F), to the housing (9).

7. The multi-gear transmission according to claim 1, wherein at least nine forward gears (G1, G2, G3, G4, G5, G6, G7, GB, G9, Z) and at least one reverse gear (R) are engagable, and the nine forward gears and the reverse gear are engaged by engagement of at least three of the shifting elements (A, B, C, D, E, F).

8. The multi-gear transmission according to claim 1, wherein the first shifting element (A), the second shifting element (B) and the third shifting element (C) are clutches, and the fourth shifting element (D), the fifth shifting element (E) and the sixth shifting element (F) are brakes.

9. The multi-gear transmission according to claim 8, wherein at least one of the first shifting element (A) and the fifth shifting element (E) is an interlocking shifting element.

10. The multi-gear transmission according to claim 1, wherein the first planetary gearset (RS1), the second planetary (RS2), the third planetary gearset (RS3) and the fourth planetary gearset (RS4) are each minus planetary gearsets.

11. The multi-gear transmission according to claim 1, wherein the planetary carrier (PT1) of the first planetary gearset (RS1) is connected to the sun gear (SO1) of the first planetary gearset (RS1) either directly or by way of the first and the second shifting elements (B, C).

12. A multi-gear transmission of a planetary design for a vehicle, the transmission comprising:
first, second, third and fourth planetary gearsets (RS1, RS2, RS3, RS4) arranged in a housing (9), and each of the first, the second, the third and the fourth planetary gearsets comprising a sun gear, a ring gear and a planetary carrier;
first, second, third, fourth, fifth, sixth, seventh and eighth shafts (1, 2, 3, 4, 5, 6, 7, 8, 8A, 8B, 8C, 8D) arranged in the housing (9);
first, second, third, fourth, fifth and sixth shifting elements (A, B, C, D, E, F) arranged in the housing (9), and selective actuation of the first, the second, the third, the fourth, the fifth and the sixth shifting elements implement a plurality of gear steps;
the first shaft (1) being a drive input (An) and being either directly connected or indirectly connectable to the sun gear (SO3) of the third planetary gearset (RS3),
the first shaft (1) being indirectly connectable to:
  the sun gear (SO1) of the first planetary gearset (RS1),
  the planetary carrier (PT1) of the first planetary gearset (RS1), and
  the sun gear (SO2) of the second planetary gearset (RS2);
the second shaft (2) being a drive output (Ab) and being directly connected to the ring gear (HO4) of the fourth planetary gearset (RS4), and the second shaft (2) being either directly connected or indirectly connectable to the planetary carrier (PT3) of the third planetary gearset (RS3);
the sun gear (SO1) and the planetary carrier (PT1) of the first planetary gearset (RS1) and the sun gear (SO4) of the fourth planetary gearset (RS4) are respectively connectable to the housing (9);
the ring gear (HO1) of the first planetary gearset (RS1) is connected to the planetary carrier (PT4) of the fourth planetary gearset (RS4) and is either connected or connectable to the ring gear (HO2) of the second planetary gearset (RS2);
the planetary carrier (PT2) of the second planetary gearset (RS2) and the ring gear (HO3) of the third planetary gearset (RS3) being either connected or connectable to one another;
the first, the second and the third shifting elements (A, B, C) are each clutches and the fourth, the fifth and the sixth shifting elements (D, E, F) are each brakes;

the first shaft (1) is connected to the sun gear (SO3) of the third planetary gearset (RS3);
the first shaft (1) is connectable, via the second shifting element (B) and the third shaft (3), to the planetary carrier (PT1) of the first planetary gearset (RS1) and to the sun gear (SO2) of the second planetary gearset (RS2);
the planetary carrier (PT1) of the first planetary gearset (RS1) is connectable, via the third shaft (3) and the fifth shifting element (E), to the housing (9);
the first shaft (1) is connectable, via the third shifting element (C) and the fourth shaft (4), to the sun gear (SO1) of the first planetary gearset (RS1);
the sun gear (SO1) of the first planetary gearset (RS1) is connectable, via the fourth shaft (4) and the fourth shifting element (D), to the housing (9);
the second shaft (2) is connected to the ring gear (HO4) of the fourth planetary gearset (RS4) and the second shaft (2) is connectable, via the first shifting element (A) and the eighth shaft (8A), to the planetary carrier (PT3) of the third planetary gearset (RS3);
the ring gear (HO1) of the first planetary gearset (RS1) is connected, by the seventh shaft (7), to both the ring gear (HO2) of the second planetary gearset (RS2) and to the planetary carrier (PT4) of the fourth planetary gearset (RS4);
the planetary carrier (PT2) of the second planetary gearset (RS2) is connected by the sixth shaft (6) to the ring gear (HO3) of the third planetary gearset (RS3); and
the sun gear (SO4) of the fourth planetary gearset (RS4) is connectable, via the fifth shaft (5) and the sixth shifting element (F), to the housing (9).

13. A multi-gear transmission of a planetary design for a vehicle, the transmission comprising:
first, second, third and fourth planetary gearsets (RS1, RS2, RS3, RS4) arranged in a housing (9), and each of the first, the second, the third and the fourth planetary gearsets comprising a sun gear, a ring gear and a planetary carrier;
first, second, third, fourth, fifth, sixth, seventh and eighth shafts (1, 2, 3, 4, 5, 6, 7, 8, 8A, 8B, 8C, 8D) arranged in the housing (9);
first, second, third, fourth, fifth and sixth shifting elements (A, B, C, D, E, F) arranged in the housing (9), and selective actuation of the first, the second, the third, the fourth, the fifth and the sixth shifting elements implement a plurality of gear steps;
the first shaft (1) being a drive input (An) and being either directly connected or indirectly connectable to the sun gear (SO3) of the third planetary gearset (RS3),
the first shaft (1) being indirectly connectable to:
  the sun gear (SO1) of the first planetary gearset (RS1),
  the planetary carrier (PT1) of the first planetary gearset (RS1), and
  the sun gear (SO2) of the second planetary gearset (RS2);
the second shaft (2) being a drive output (Ab) and being directly connected to the ring gear (HO4) of the fourth planetary gearset (RS4), and the second shaft (2) being either directly connected or indirectly connectable to the planetary carrier (PT3) of the third planetary gearset (RS3);
the sun gear (SO1) and the planetary carrier (PT1) of the first planetary gearset (RS1) and the sun gear (SO4) of the fourth planetary gearset (RS4) are respectively connectable to the housing (9);

the ring gear (HO1) of the first planetary gearset (RS1) is connected to the planetary carrier (PT4) of the fourth planetary gearset (RS4) and is either connected or connectable to the ring gear (HO2) of the second planetary gearset (RS2);

the planetary carrier (PT2) of the second planetary gearset (RS2) and the ring gear (HO3) of the third planetary gearset (RS3) being either connected or connectable to one another;

the first, the second and the third shifting elements (A, B, C) are each clutches and the fourth, the fifth and the sixth shifting elements (D, E, F) are each brakes;

the first shaft (1) is connected to the sun gear (SO3) of the third planetary gearset (RS3);

the first shaft (1) is connectable, via the second shifting element (B) and the third shaft (3), to both the planetary carrier (PT1) of the first planetary gearset (RS1) and to the sun gear (SO2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and the fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (HO4) of the fourth planetary gearset (RS4) and the planetary carrier (PT3) of the third planetary gearset (RS3);

the ring gear (HO1) of the first planetary gearset (RS1) is connected, by the seventh shaft (7), to the planetary carrier (PT4) of the fourth planetary gearset (RS4);

the ring gear (HO1) of the first planetary gearset (RS1) is connectable, via the seventh shaft (7) and the first shifting element (A) and the eighth shaft (8C), to the ring gear (HO2) of the second planetary gearset (RS2);

the planetary carrier (PT2) of the second planetary gearset (RS2) is connected by the sixth shaft (6) to the ring gear (HO3) of the third planetary gearset (RS3); and the sun gear (SO4) of the fourth planetary gearset (RS4) is connectable, via the fifth shaft (5) and the sixth shifting element (F), to the housing (9).

14. A multi-gear transmission of a planetary design for a vehicle, the transmission comprising:

first, second, third and fourth planetary gearsets (RS1, RS2, RS3, RS4) arranged in a housing (9), and each of the first, the second, the third and the fourth planetary gearsets comprising a sun gear, a ring gear and a planetary carrier;

first, second, third, fourth, fifth, sixth, seventh and eighth shafts (1, 2, 3, 4, 5, 6, 7, 8, 8A, 8B, 8C, 8D) arranged in the housing (9);

first, second, third, fourth, fifth and sixth shifting elements (A, B, C, D, E, F) arranged in the housing (9), and selective actuation of the first, the second, the third, the fourth, the fifth and the sixth shifting elements implement a plurality of gear steps;

the first shaft (1) being a drive input (An) and being either directly connected or indirectly connectable to the sun gear (SO3) of the third planetary gearset (RS3), the first shaft (1) being indirectly connectable to:

the sun gear (SO1) of the first planetary gearset (RS1), the planetary carrier (PT1) of the first planetary gearset (RS1), and the sun gear (SO2) of the second planetary gearset (RS2);

the second shaft (2) being a drive output (Ab) and being directly connected to the ring gear (HO4) of the fourth planetary gearset (RS4), and the second shaft (2) being either directly connected or indirectly connectable to the planetary carrier (PT3) of the third planetary gearset (RS3);

the sun gear (SO1) and the planetary carrier (PT1) of the first planetary gearset (RS1) and the sun gear (SO4) of the fourth planetary gearset (RS4) are respectively connectable to the housing (9);

the ring gear (HO1) of the first planetary gearset (RS1) is connected to the planetary carrier (PT4) of the fourth planetary gearset (RS4) and is either connected or connectable to the ring gear (HO2) of the second planetary gearset (RS2);

the planetary carrier (PT2) of the second planetary gearset (RS2) and the ring gear (HO3) of the third planetary gearset (RS3) being either connected or connectable to one another;

the first, the second and the third shifting elements (A, B, C) are each clutches and the fourth, the fifth and the sixth shifting elements (D, E, F) are each brakes;

the first haft (1) is connected to the sun gear (SO3) of the third planetary gearset (RS3);

the first shaft (1) is connectable, via the second shifting element (B), to the third shaft (3) which is connected to the planetary carrier (PT1) of the first planetary gearset (RS1);

the third shaft (3) is connectable, via the first shifting element (A) and the eighth shaft (8D), to the sun gear (SO2) of the second planetary gearset (RS2);

the planetary carrier (PT1) of the first planetary gearset (RS1) is connectable, via the third shaft (3) and the fifth shifting element (E), to the housing (9);

the first shaft (1) is connectable, via the third shifting element (C) and the fourth shaft (4), to the sun gear (SO1) of the first planetary gearset (RS1);

the sun gear (SO1) of the first planetary gearset (RS1) is connectable, via the fourth shaft (4) and the fourth shifting element (D), to the housing (9);

the second shaft (2) is connected to both the ring gear (HO4) of the fourth planetary gearset (RS4) and the planetary carrier (PT3) of the third planetary gearset (RS3);

the ring gear (HO1) of the first planetary gearset (RS1) is connected, by the seventh shaft (7), to both the ring gear (HO2) of the second planetary gearset (RS2) and the planetary carrier (PT4) of the fourth planetary gearset (RS4);

the planetary carrier (PT2) of the second planetary gearset (RS2) is connected, by the sixth shaft (6), to the ring gear (HO3) of the third planetary gearset (RS3); and the sun gear (SO4) of the fourth planetary gearset (RS4) is connectable, via the fifth shaft (5) and the sixth shifting element (F), to the housing (9).

* * * * *